US011388070B2

(12) United States Patent
Lee et al.

(10) Patent No.: US 11,388,070 B2
(45) Date of Patent: *Jul. 12, 2022

(54) METHOD AND SYSTEM FOR PROVIDING SERVICE EXPERIENCE ANALYSIS BASED ON NETWORK DATA ANALYSIS

(71) Applicant: ELECTRONICS AND TELECOMMUNICATIONS RESEARCH INSTITUTE, Daejeon (KR)

(72) Inventors: Soohwan Lee, Daejeon (KR); Myung Ki Shin, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/344,079

(22) Filed: Jun. 10, 2021

(65) Prior Publication Data

US 2021/0306231 A1     Sep. 30, 2021

Related U.S. Application Data

(63) Continuation of application No. 16/868,763, filed on May 7, 2020, now Pat. No. 11,038,776.

(30) Foreign Application Priority Data

| May 7, 2019 | (KR) | 10-2019-0053305 |
| Jun. 14, 2019 | (KR) | 10-2019-0070836 |
| Jun. 18, 2019 | (KR) | 10-2019-0072327 |
| Sep. 26, 2019 | (KR) | 10-2019-0119026 |
| Oct. 4, 2019 | (KR) | 10-2019-0123044 |
| Jan. 7, 2020 | (KR) | 10-2020-0002256 |
| Apr. 10, 2020 | (KR) | 10-2020-0044263 |
| May 7, 2020 | (KR) | 10-2020-0054202 |

(51) Int. Cl.
*G06F 15/173* (2006.01)
*H04L 43/55* (2022.01)
(Continued)

(52) U.S. Cl.
CPC .......... *H04L 41/5038* (2013.01); *H04L 41/14* (2013.01); *H04L 41/5067* (2013.01); *H04L 43/028* (2013.01)

(58) Field of Classification Search
CPC . H04L 41/5038; H04L 41/5067; H04L 41/14; H04L 43/028
See application file for complete search history.

(56) References Cited

U.S. PATENT DOCUMENTS 7,930,376 B2    4/2011  Levilain et al.
8,181,195 B2    5/2012  Sardera
(Continued)

FOREIGN PATENT DOCUMENTS

WO       2019-032968 A1    2/2019

*Primary Examiner* — Richard G Keehn
(74) *Attorney, Agent, or Firm* — LRK Patent Law Firm

(57) ABSTRACT

A method and system for providing service experience analysis based on network data analysis is disclosed. According to the method, the NWDAF device can provide the service experience statistics or service experience prediction for an application or a network slice.

20 Claims, 15 Drawing Sheets

(51) Int. Cl.
*H04L 43/028* (2022.01)
*H04L 41/5067* (2022.01)
*H04L 41/14* (2022.01)

(56) References Cited

U.S. PATENT DOCUMENTS

| | | | |
|---|---|---|---|
| 2018/0262924 A1* | 9/2018 | Dao | H04W 72/1257 |
| 2019/0050578 A1 | 2/2019 | Choi | |
| 2019/0155922 A1 | 5/2019 | Kim et al. | |
| 2019/0253917 A1* | 8/2019 | Dao | H04L 12/1407 |
| 2019/0356558 A1* | 11/2019 | Han | H04L 41/5009 |
| 2020/0112868 A1* | 4/2020 | Shariat | H04W 24/02 |
| 2020/0112921 A1* | 4/2020 | Han | H04W 8/06 |
| 2020/0127907 A1* | 4/2020 | Koo | H04L 43/06 |
| 2020/0218715 A1* | 7/2020 | Chen | H04L 12/14 |
| 2020/0228422 A1* | 7/2020 | Chong | H04L 41/5054 |
| 2020/0229042 A1* | 7/2020 | Srivastava | H04W 28/24 |
| 2020/0252813 A1* | 8/2020 | Li | G06Q 20/382 |
| 2020/0288296 A1* | 9/2020 | Fiorese | H04L 41/147 |
| 2020/0322821 A1* | 10/2020 | Lee | H04W 24/10 |
| 2020/0344625 A1* | 10/2020 | Xin | H04W 24/08 |

* cited by examiner

FIG. 7

| Service name | Description |
|---|---|
| Nwdaf_AnalyticsSubscription | This service enables the NF service consumers to subscribe/unsubscribe for different type of analytics from NWDAF. |
| Nwdaf_AnalyticsInfo | This service enables the NF service consumers to request and get different type of analytics information from NWDAF. |

FIG. 8

| Service producer | Service |
|---|---|
| AMF | Namf_EventExposure |
| SMF | Nsmf_EventExposure |
| PCF | Npcf_EventExposure (for a group of UEs or any UE)<br>Npcf_PolicyAuthorization_Subscribe (for a specific UE) |
| UDM | Nudm_EventExposure |
| NEF | Nnef_EventExposure |
| AF | Naf_EventExposure |
| NRF | Nnrf_NFDiscovery<br>Nnrf_NFManagement |

FIG. 9

| Information | Description |
|---|---|
| Application ID (1..n) | The identification of the application(s) for which the analytics information is subscribed or requested. |
| S-NSSAI | Identifies the Network Slice for which analytics information is subscribed or requested. |
| Area of Interest | Identifies the Area (i.e. set of TAIs) where the analytics information is subscribed or requested. |
| Media/application bandwidth | Identifies the Media/application bandwidth requirement of the application. |
| DNN | DNN to access the application. |
| DNAI | Identifier of a user plane access to one or more DN(s) where applications are deployed |

FIG. 10

| Information | Source | Description |
|---|---|---|
| Application ID | AF | To identify the service and support analytics per type of service (the desired level of service) |
| IP filter information | AF | Identify a service flow of the UE for the application |
| Locations of Application | AF/NEF | Locations of application represented by a list of DNAI(s). The NEF may map the AF-Service-Identifier information to a list of DNAI(s) when the DNAI(s) being used by the application are statically defined. |
| Service Experience | AF | Refers to the QoE per service flow as established in the SLA and during on boarding. It can be either e.g. MOS or video MOS or a customized MOS |
| Timestamp | AF | A time stamp associated to the Service Experience provided by the AF, mandatory if the Service Experience is provided by the ASP. |

FIG. 11

| Information | Source | Description |
|---|---|---|
| Timestamp | 5GC NF | A time stamp associated with the collected information. |
| Location | AMF | The UE location information. |
| SUPI(s) | AMF | If UE IDs are not provided as target of analytics reporting for slice service experience, AMF returns the UE IDs matching the AMF event filters. |
| DNN | SMF | DNN for the PDU Session which contains the QoS flow |
| S-NSSAI | SMF | S-NSSAI for the PDU Session which contains the QoS flow |
| Application ID | SMF | Used by NWDAF to identify the application service provider and application for the QoS flow |
| IP filter information | SMF | Provided by the SMF, which is used by NWDAF to identify the service data flow for policy control and/or differentiated charging for the QoS flow |
| QFI | SMF | QoS Flow Identifier |
| QoS flow Bit Rate | UPF | The observed bit rate for UL direction; and The observed bit rate for DL direction |
| QoS flow Packet Delay | UPF | The observed Packet delay for UL direction; and The observed Packet delay for the DL direction |
| Packet transmission | UPF | The observed number of packet transmission |
| Packet retransmission | UPF | The observed number of packet retransmission |

FIG. 12

| Information | Source | Description |
|---|---|---|
| Timestamp | OAM | A time stamp associated with the collected information. |
| Reference Signal Received Power | OAM | The per UE measurement of the received power level in a network cell, including SS-RSRP, CSI-RSRP and E-UTRA RSRP |
| Reference Signal Received Quality | OAM | The per UE measurement of the received quality in a network cell, including SS-RSRQ, CSI-RSRQ and E-UTRA RSRQ |
| Signal-to-noise and interference ratio | OAM | The per UE measurement of the received signal to noise and interference ratio in a network cell, including SS-SINR, CSI-SINR, E-UTRA RS-SINR |

FIG. 13

| Information | Presence | Description |
|---|---|---|
| Application ID (1..n) | Conditional | An identification of the application or a set of identifications of the applications. |
| Area of Interest | Conditional | Area of Interest which restricts the area in focus |

FIG. 14

| Information | Description |
|---|---|
| S-NSSAI | Identifies the Network Slice for which analytics information is provided. |
| Service experiences (1...n) | List of observed service experience information for each Network Slice instance. |
| > NSI ID | Identifies the Network Slice instance within the Network Slice. |
| > Slice instance service experience | Service experience across Applications on a Network Slice instance over the Analytics target period (average, variance). |
| > Application ServiceExperiences (1..max) | List of observed service experience information for each Application. |
| >> Application ID | Identification of the application. |
| >> Service Experience Type | Type of Service Experience analytics, e.g. on voice, video, other. |
| >> Service Experience | Service Experience over the Analytics target period (average, variance). |
| >> SUPI list (0..SUPImax) | List of SUPI(s) for each application service experience. |
| >> Ratio | Estimated percentage of UEs with similar service experience (in the group, or among all UEs). |
| >> Spatial validity | Area where the estimated Service Experience applies. If Area of Interest information was provided in the request or subscription, spatial validity should be the requested Area of Interest. |
| >> Validity period | Validity period |
| Slice service experience | Service experience across applications on a Network Slice over the Analytics target period (average, variance). |

FIG. 15

| Information | Description |
|---|---|
| S-NSSAI | Identifies the Network Slice for which analytics information is provided. |
| Service experiences (1...n) | List of observed service experience information for each Network Slice instance. |
| > NSI ID | Identifies the Network Slice instance within the Network Slice. |
| > Slice instance service experience | Service experience across Applications on a Network Slice instance over the Analytics target period (average, variance). |
| > Application ServiceExperiences (1..max) | List of observed service experience information for each Application. |
| >> Application ID | Identification of the application. |
| >> Service Experience Type | Type of Service Experience analytics, e.g. on voice, video, other. |
| >> Service Experience | Service Experience over the Analytics target period (average, variance). |
| >> SUPI list (0..SUPImax) | List of SUPI(s) for each application service experience. |
| >> Ratio | Estimated percentage of UEs with similar service experience (in the group, or among all UEs). |
| >> Spatial validity | Area where the estimated Service Experience applies. If Area of Interest information was provided in the request or subscription, spatial validity should be the requested Area of Interest. |
| >> Validity period | Validity period |
| >> Probability assertion | Confidence of this prediction. |
| Slice service experience | Service experience across applications on a Network Slice over the Analytics target period (average, variance). |

METHOD AND SYSTEM FOR PROVIDING SERVICE EXPERIENCE ANALYSIS BASED ON NETWORK DATA ANALYSIS

CROSS-REFERENCE TO RELATED APPLICATION(S)

This application is a continuation of U.S. patent application Ser. No. 16/868,763, filed May 7, 2020, which claims the benefit of Korean Patent Application No. 10-2019-0053305, filed on May 7, 2019, No. 10-2019-0070836, filed on Jun. 14, 2019, No. 10-2019-0072327, filed on Jun. 18, 2019, No. 10-2019-0119026 filed on Sep. 26, 2019, No. 10-2019-0123044 filed on Oct. 4, 2019, No. 10-2020-0002256 filed on Jan. 7, 2020, No. 10-2020-0044263 filed on Apr. 10, 2020, and No. 10-2020-0054202 filed on May 7, 2020, in the Korean Intellectual Property Office, the disclosure of which is incorporated herein by reference.

BACKGROUND

1. Field of the Invention

One or more example embodiments relate to a providing service experience analytics based on network data analytic.

2. Description of Related Art

User Equipment (UE) use communication service with various types via a network. By using the communication service, UE may satisfy the communication service or not. To this end, the network needs a function related to how to evaluate the satisfaction with the communication service when the UE uses the communication service.

SUMMARY

According to an aspect, there is provided a method for providing service experience analysis, comprising: receiving, by a NWDAF device, Nnwdaf_AnalyticsInfo_Request service operation or Nnwdaf_AnalyticsSubscription_Subscribe service operation including analytics ID set to service experience from a first NF device; invoking, by the NWDAF device, Naf_EventExposure_Subscribe service operation including event ID set to service data to an AF device; invoking, by the NWDAF device, Nnf_EventExposure_Subscribe service operation including event ID to a second NF device as a network data provider; deriving, by the NWDAF device, a request analytics for an application; invoking Nnwdaf_AnalyticsInfo_Request Response service operation or Nnwdaf_Analytics_Subscription_Notify service operation including an estimated service experience to the first NF device.

The Nnwdaf_AnalyticsInfo_Request service operation or Nnwdaf_AnalyticsSubscription_Subscribe service operation includes (i) Analytic ID set to service experience, (ii) Target of Analytics Reporting set to any UE and (iii) Analytic filter information set to Application ID, Analytics target period, S-NSSAI, DNN and area of interest.

The service experience statistics information includes at least one of S-NSSAI, Service experiences, NSI ID, Slice instance service experience, Application ServiceExperiences, Application ID, Service Experience Type, Service Experience, SUPI list, Ratio and Spatial validity.

The service experience prediction information at least one of S-NSSAI, Service experiences, NSI ID, Slice instance service experience, Application ServiceExperiences, Application ID, Service Experience Type, Service Experience, SUPI list, Ratio, Probability assertion and Spatial validity.

The NWDAF device subscribes a service data from the AF device by invoking the Nnef_EventExposure_Subscribe service operation or the Naf_EventExposure_Subscribe service operation.

The Nnef_EventExposure_Subscribe service operation or the Naf_EventExposure_Subscribe service operation includes (i) Event ID set to service experience information, (ii) Event filter information set to application ID and area of interest, and (iii) target of event reporting set to any UE.

The NWDAF device provides a data analytics to the second NF device using Nnwdaf_AnalyticsInfo_Request response service operation or Nnwdaf_AnalyticsSubscription_Notify service operation, wherein the data analytics is an observed service experience.

The data analytics indicate how well a used QoS parameters satisfy a Service MoS agreed between a MNO (Mobile Network Operator) and the end user or between the MNO and an external ASP (Application Service Provider).

The NWDAF device receives an analytic request or an analytic subscription by invoking Nnwdaf_AnalyticsInfo_Request service operation or Nnwdaf_AnalyticsSubscription_Subscribe service operation by the first NF device.

According to an aspect, there is provided a method for providing service experience analysis comprising: receiving, by a NWDAF device, Nnwdaf_AnalyticsInfo_Request service operation or Nnwdaf_Analytics_Subscription_Subscribe service operation including Analytic ID set to service experience from a first NF device; invoking, by the NWDAF device, Nnf_EventExposure_Subscribe Request service operation including Event ID, Event filter and Event Reporting information to a second NF device as network data provider; invoking, by the NWDAF device, Naf_EventExposure_Subscribe service operation including Event ID set to service data to an AF device; deriving, by the NWDAF device, a requested analytics for a network slice; invoking Nnwdaf_AnalyticsInfo_Request Response service operation or Nnwdaf_Analytics_Subscription_Notify service operation including an estimated service experience to the first NF device.

According to an aspect, there is provided a system for providing service experience analysis comprising: one or more processor of a NWDAF device configured to receive Nnwdaf_AnalyticsInfo_Request service operation or Nnwdaf_AnalyticsSubscription_Subscribe service operation including analytics ID set to service experience from a first NF device; invoke Naf_EventExposure_Subscribe service operation including event ID set to service data to an AF device; invoke Nnf_EventExposure_Subscribe service operation including event ID to a second NF device as a network data provider; derive a request analytics for an application; invoke Nnwdaf_AnalyticsInfo_Request Response service operation or Nnwdaf_Analytics_Subscription_Notify service operation including an estimated service experience to the first NF device.

The Nnwdaf_AnalyticsInfo_Request service operation or Nnwdaf_AnalyticsSubscription_Subscribe service operation includes (i) Analytic ID set to service experience, (ii) Target of Analytics Reporting set to any UE and (iii) Analytic filter information set to Application ID, Analytics target period, S-NSSAI, DNN and area of interest.

The service experience statistics information includes at least one of S-NSSAI, Service experiences, NSI ID, Slice instance service experience, Application ServiceExperiences, Application ID, Service Experience Type, Service Experience, SUPI list, Ratio and Spatial validity.

The service experience prediction information at least one of S-NSSAI, Service experiences, NSI ID, Slice instance service experience, Application ServiceExperiences, Application ID, Service Experience Type, Service Experience, SUFI list, Ratio, Probability assertion and Spatial validity.

The NWDAF device subscribes a service data from the AF device by invoking the Nnef_EventExposure_Subscribe service operation or the Naf_EventExposure_Subscribe service operation.

The Nnef_EventExposure_Subscribe service operation or the Naf_EventExposure_Subscribe service operation includes (i) Event ID set to service to experience information, (ii) Event filter information set to application ID and area of interest, and (iii) target of event reporting set to any UE.

The NWDAF device provides a data analytics to the second NF device using Nnwdaf_AnalyticsInfo_Request response service operation or Nnwdaf_AnalyticsSubscription_Notify service operation, wherein the data analytics is an observed service experience.

The data analytics indicate how well a used QoS parameters satisfy a Service MoS agreed between a MNO (Mobile Network Operator) and the end user or between the MNO and an external ASP (Application Service Provider).

The NWDAF device receives an analytic request or an analytic subscription by invoking Nnwdaf_AnalyticsInfo_Request service operation or Nnwdaf_AnalyticsSubscription_Subscribe service operation by the first NF device.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 7 is a diagram illustrating network service functions provided by the NWDAF device according to an example embodiment;

FIG. 8 is a diagram illustrating network service functions consumed by the NWDAF device for a data collection according to an example embodiment;

FIG. 9 is a diagram illustrating analytic filter information related to observed service experience according to an example embodiment;

FIG. 10 is a diagram illustrating service data collected from the AF device related to the observed service experience according to an example embodiment;

FIG. 11 is a diagram illustrating QoS flow level of network data collected from NF device in 5G core network related to QoS profile according to an example embodiment;

FIG. 12 is a diagram illustrating UE level of network data collected from the OAM device related to QoS profile according to an example embodiment; and FIG. 13 is a diagram illustrating event filter information related to service data collected from the AF device according to an example embodiment;

FIG. 14 is a diagram illustrating Service Experience statistics according to an example embodiment; and FIG. 15 is a diagram illustrating Service Experience predictions according to an example embodiment.

DETAILED DESCRIPTION OF THE INVENTION

Figure 1:
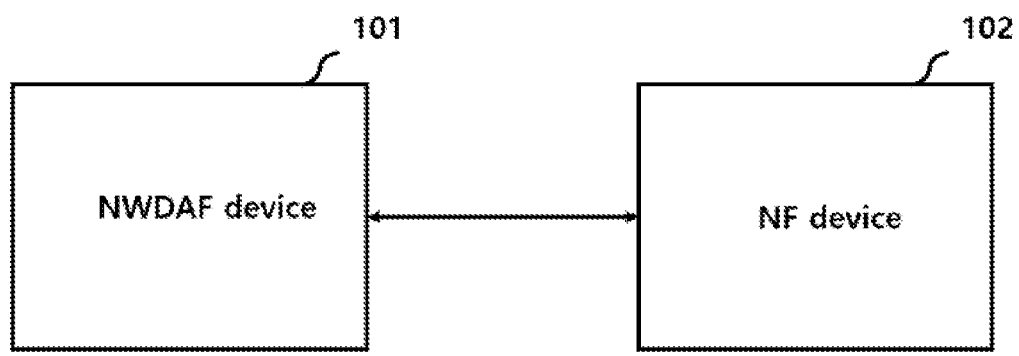
FIG. 1 is a diagram illustrating a relationship between NWDAF device and NF device according to an example embodiment.

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

The terminology used herein is for the purpose of describing particular embodiments only and is not intended to be limiting. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

Hereinafter, the example embodiments will be described in detail with reference to the accompanying drawings. The full name of a word used in the present invention is as follows. And, the term AMF, AF, NEF, NRF, PCF, UDM, NWDAF, CHF, NF, and SMF may be represented as device.

5GC: 5G Core Network
AF: Application Function
AMF: Access and Mobility Management Function
AUSF: Authentication Server Function
CHF: Charging Function
FQDN: Fully Qualified Domain Name
GPSI: Generic Public Subscription Identifier
NEF: Network Exposure Function
NF: Network Function
NRF: Network Repository Function
NWDAF: Network Data Analytics Function
PCF: Policy Control Function
PDU: Protocol Data Unit
SMF: Session Management Function
S-NSSAI: Single Network Slice Selection Assistance Information
SUPI: Subscription Permanent Identifier
UDM: Unified Data Management
UDR: Unified Data Repository FIG. 1 is a diagram illustrating a relationship between NWDAF device and NF device according to an example embodiment.

<Network Data Analytics Function (NWDAF)>

NWDAF represents operator managed network analytics logical function. The NWDAF includes the following functionality:

Support data collection from NFs and AFs;
Support data collection from OAM;
NWDAF service registration and metadata exposure to NFs/AFs;
Support analytics information provisioning to NFs, AF.

<Reference Architecture for Data Analytics>

The NWDAF (Network Data Analytics Function) is part of the architecture and uses the mechanisms and interfaces specified for 5GC and OAM services.

The NWDAF interacts with different entities for different purposes:

Data collection based on subscription to events provided by AMF, SMF, PCF, UDM, AF (directly or via NEF), and OAM;
Retrieval of information from data repositories (e.g. UDR via UDM for subscriber-related information);
Retrieval of information about NFs (e.g. from NRF for NF-related information);
On demand provision of analytics to consumers.

A single instance or multiple instances of NWDAF may be deployed in a PLMN. If multiple NWDAF instances are deployed, the architecture supports deploying the NWDAF as a central NF, as a collection of distributed NFs, or as a combination of both.

When multiple NWDAFs exist, not all of them need to be able to provide the same type of analytics results. For example, some of multiple NWDAFs may be specialized in providing certain types of analytics. An Analytics ID information element is used to identify the type of supported analytics that NWDAF may generate.

NWDAF instance(s) may be collocated with a 5GC (5G core network) NF.

<Non-Roaming Architecture>

The 5G System architecture allows NWDAF to collect data from any 5GC NF. The NWDAF belongs to the same PLMN as the 5GC NF that provides the data.

The Nnf interface is defined for the NWDAF to request subscription to data delivery for a particular context, to cancel subscription to data delivery and to request a specific report of data for a particular context.

The 5G System architecture allows NWDAF to retrieve the management data from OAM by invoking OAM services.

The 5G System architecture allows any 5GC NF to request network analytics information from NWDAF. The NWDAF belongs to the same PLMN as the 5GC NF that consumes the analytics information.

<Network Data Analytics Functional Description>

The NWDAF provides analytics to 5GC NFs, and OAM.

Analytics information are either statistical information of the past events, or predictive information.

Different NWDAF instances may be present in the 5GC, with possible specializations per type of analytics. The capabilities of a NWDAF instance are described in the NWDAF profile stored in the NRF.

In order to support NFs that are consumers of analytics with the discovery of a NWDAF instance that is able to provide some specific type of analytics, each NWDAF instance should provide the list of Analytics ID(s) that it supports when registering to the NRF, in addition to other NRF registration elements of the NF profile. Other NFs requiring the discovery of an NWDAF instance that provides support for some specific type of analytics may query the NRF and include the Analytics ID(s) that identifies the desired type of analytics for that purpose.

The consumers including 5GC NFs and OAM decide how to use the data analytics provided by NWDAF. The interactions between 5GC NF(s) and the NWDAF take place within a PLMN. The NWDAF has no knowledge about NF application logic. The NWDAF may use subscription data but only for statistical purpose.

<NWDAF Discovery and Selection>

The NWDAF service consumer selects an NWDAF that supports requested analytics information by using the NWDAF discovery principles.

<NWDAF Discovery and Selection>

Multiple instances of NWDAF may be deployed in a network.

The NF consumers may utilize the NRF to discover NWDAF instance(s) unless NWDAF information is available by other means, e.g. locally configured on NF consumers. The NWDAF selection function in NF consumers selects an NWDAF instance based on the available NWDAF instances.

The following factors may be considered by the NF consumer for NWDAF selection:

S-NSSAI.
Analytics ID(s).
NWDAF Serving Area information, i.e. list of TAIs for which the NWDAF can provide analytics.

<Procedures to Support Network Data Analytics>

Figure 2:
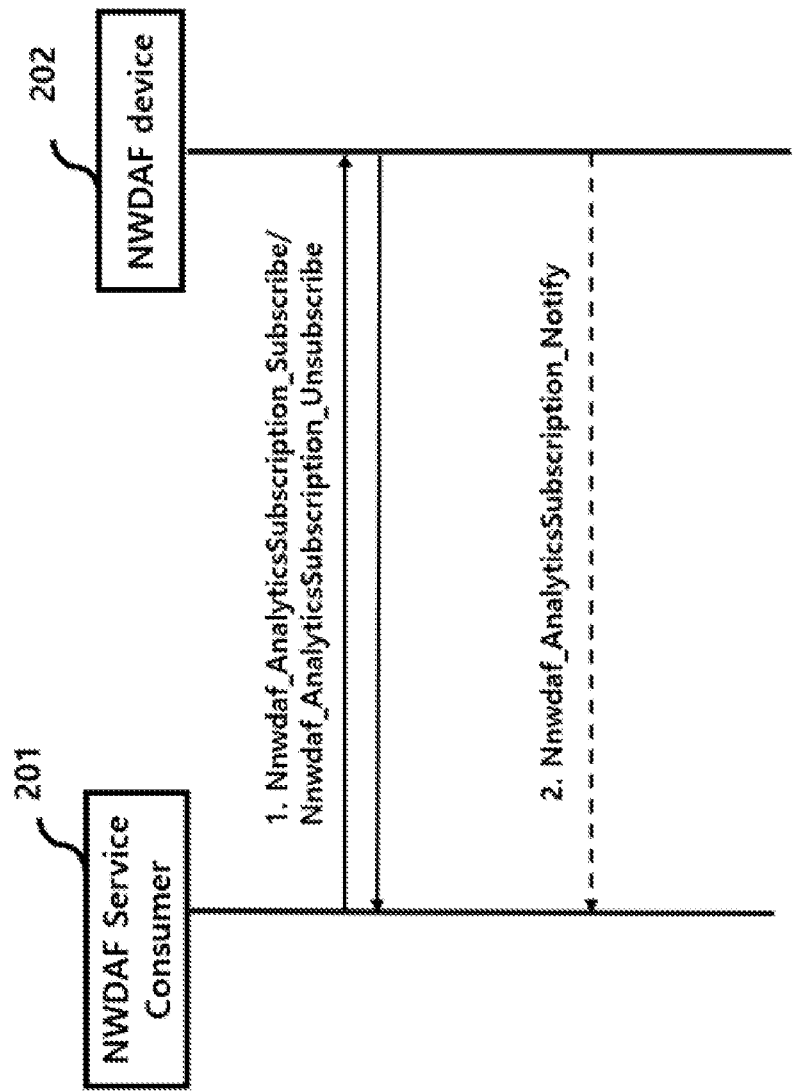
FIG. 2 is a diagram illustrating subscription/unsubscription of network data analytic according to an example embodiment.

FIG. 2 is a diagram illustrating subscription/unsubscription of network data analytic according to an example embodiment.

<Analytics Subscribe/Unsubscribe by NWDAF Service Consumer>

This procedure of FIG. 2 is used by any NWDAF service consumer (e.g. including NFs/OAM) to subscribe/unsubscribe at NWDAF to be notified on analytics information, using Nnwdaf_AnalyticsSubscription service.

This service is also used by an NWDAF service consumer to modify existing analytics subscription(s). Any entity can consume this service.

1. The NWDAF service consumer subscribes to or cancels subscription to analytics information by invoking the Nnwdaf_AnalyticsSubscription_Subscribe/Nnwdaf_AnalyticsSubscription_Unsubscribe service operation. The parameters that can be provided by the NWDAF service consumer are listed.

When a subscription to analytics information is received, the NWDAF determines whether triggering new data collection is needed.

If the service invocation is for a subscription modification, the NF service consumer includes an identifier (Subscription Correlation ID) to be modified in the invocation of Nnwdaf_AnalyticsSubscription_Subscribe.

2. If NWDAF service consumer subscribes to analytics information, the NWDAF notifies the NWDAF service consumer with the analytics information by invoking Nnwdaf_AnalyticsSubscription_Notify service operation, based on the request from the NWDAF service consumer, e.g. Analytics Reporting Parameters.

Figure 3:
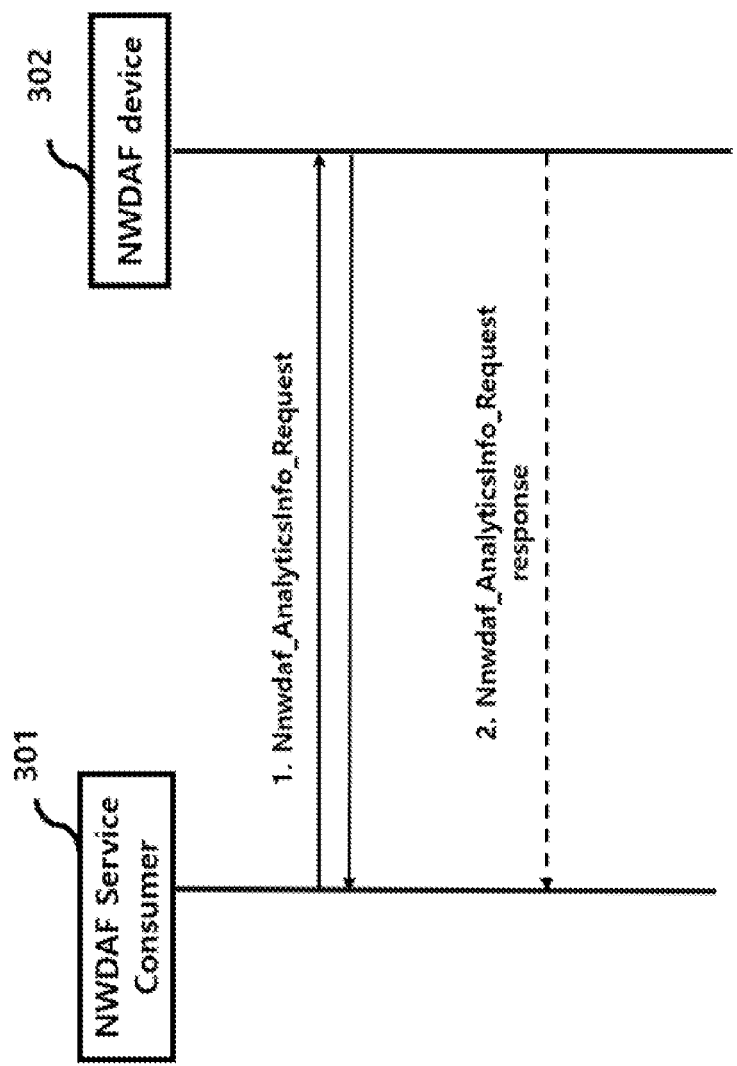
FIG. 3 is a diagram illustrating a request of network data analytic according to an example embodiment.

FIG. 3 is a diagram illustrating a request of network data analytic according to an example embodiment.

<Analytics Request by NWDAF Service Consumer>

This procedure of FIG. 3 is used by the NWDAF service consumer (e.g. including NFs/OAM) to request and get from NWDAF analytics information, using Nnwdaf_AnalyticsInfo service.

1. The NWDAF service consumer requests analytics information by invoking Nnwdaf_AnalyticsInfo_Request service operation. The parameters that can be provided by the NWDAF service consumer are listed.

When a request for analytics information is received, the NWDAF determines whether triggering new data collection is needed.

2. The NWDAF responds with analytics information to the NWDAF service consumer.

The input parameters are described in FIG. 2 and FIG. 3 including the service operation in following:

<Contents of Analytics Exposure>

The consumers of the Nnwdaf_AnalyticsSubscription or Nnwdaf_AnalyticsInfo service operations provide the following input parameters listed below.

A list of Analytics ID(s): identifies the requested analytics.

Analytics Filter Information: indicates the conditions to be fulfilled for reporting Analytics Information. This set of optional parameter types and values enables to select which type of analytics information is requested. Analytics Filter Information are defined.

Target of Analytics Reporting: indicates the object(s) for which Analytics information is requested, entities such as specific UEs, a group of UE(s) or any UE (i.e. all UEs).

(for Nnwdaf_AnalyticsSubscription) A Notification Target Address (+Notification Correlation ID), allowing to correlate notifications received from NWDAF with this subscription.

Analytics Reporting Information with the following parameters:

(for Nnwdaf_AnalyticsSubscription) Analytics Reporting Parameters as per Event Reporting parameters.

(for Nnwdaf_AnalyticsSubscription) Reporting Thresholds, which indicate conditions on the level of each requested analytics that when reached may be notified by the NWDAF. A matching direction may be provided such as below, above, or crossed. If no matching direction is provided, the default direction is crossed.

Analytics target period: time interval [start..end], either in the past (both start time and end time in the past) or in the future (both start time and end time in the future). An Analytics target period in the past is a request or subscription for statistics. An Analytics target period in the future is a request or subscription for predictions. The time interval is expressed with actual start time and actual end time (e.g. via UTC time). When the Analytics Reporting Parameters indicate a periodic reporting mode, the time interval can also be expressed as positive or negative offsets to the reporting time. By setting start time and end time to the same value, the consumer of the analytics can request analytics or subscribe to analytics for a specific time rather than for a time interval.

Preferred level of accuracy of the analytics (e.g. Low/High).

(for Nnwdaf_AnalyticsInfo_Request) Time when analytics information is needed (if applicable). If the time is reached the consumer does not need to wait for the analytics information any longer, yet the NWDAF may send an error response to the consumer.

Maximum number of objects requested by the consumer (max) to limit the number of objects in a list of analytics per Nnwdaf_AnalyticsSubscription_Notify or Nnwdaf_AnalyticsInfo_Request response.

Maximum number of SUPIs (SUPImax) requested by the consumer to limit the number of SUPIs in an object. When SUPImax is not provided, the NWDAF shall return all SUPIs concerned by the analytics object. When SUPImax is set to 0, the NWDAF may not provide any SUPI.

The feasibility of the parameter "Time when analytics are needed" will be checked by stage 3.

The NWDAF provides to the consumer of the Nnwdaf_AnalyticsSubscription or Nnwdaf_AnalyticsInfo service operations, the output information listed below:

(for Nnwdaf_AnalyticsSubscription) The Notification Correlation Information.

For each Analytics ID the analytics information in the requested Analytics target period.

In addition, the following additional information:

Timestamp of analytics generation, which allows consumers to decide until when the received information may be used. For instance, an NF can deem a received notification from NWDAF for a given feedback as invalid based on this timestamp;

Validity period, which defines the time period for which the analytics information is valid.

Probability assertion: level of certainty, confidence in statistics/prediction.

Figure 4:
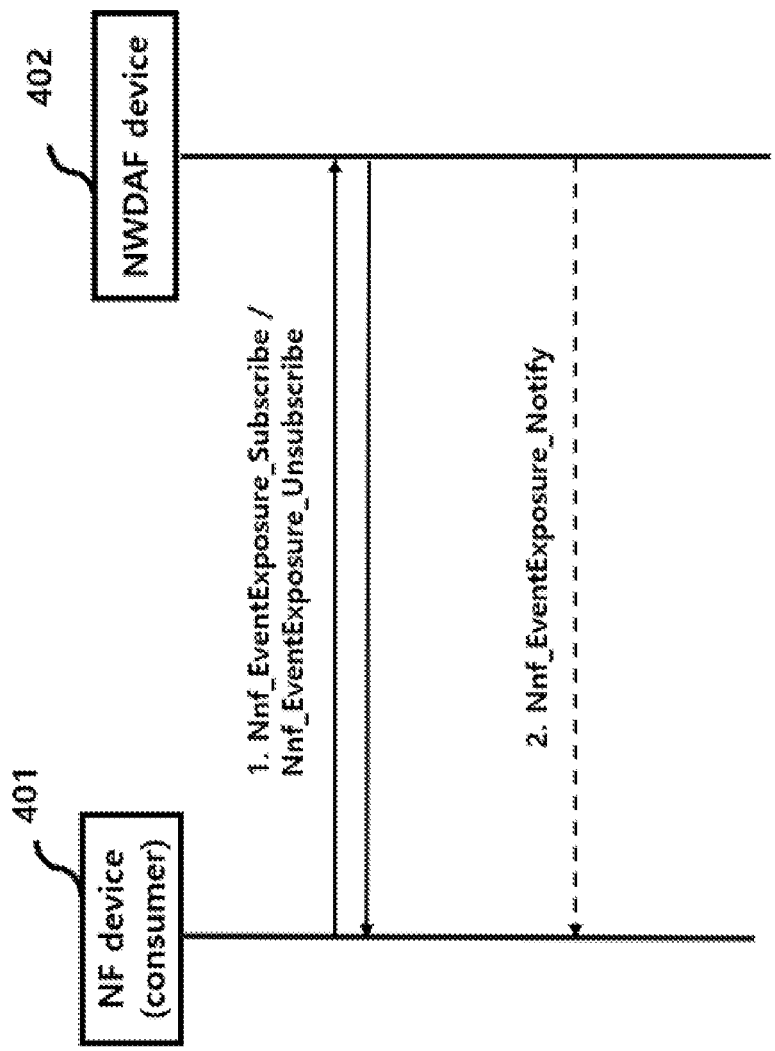
FIG. 4 is a diagram illustrating subscription/unsubscription of event exposure according to an example embodiment.

FIG. 4 is a diagram illustrating subscription/unsubscription of event exposure according to an example embodiment <Procedures for Data Collection>

The Data Collection feature permits NWDAF to retrieve data from various sources (e.g. NF such as AMF, SMF, PCF, and AF; OAM), as a basis of the computation of network analytics.

All available data encompass:

OAM global NF data,

Data available in NFs, e.g. behaviour data related to individual UEs or UE groups (e.g. UE reachability), and pre-computed metrics covering UE populations (e.g. number of UEs present in a geographical area), per spatial and temporal dimensions (e.g. per region for a period of time), NF data available in the 5GC (e.g. NRF), Data available in AF.

The NWDAF may use at least one of the following services:
- the Generic management services, the Performance Management services or the Fault Supervision services, offered by OAM in order to collect OAM global NF data.
- the Exposure services offered by NFs in order to retrieve data and other non-OAM pre-computed metrics available in the NFs.
- Other NF services in order to collect NF data (e.g. NRF) The NWDAF may obtain the proper information to perform data collection for a UE or group of UEs:
- For an Analytics ID, NWDAF is configured with the corresponding NF Type(s) and/or event ID(s) and/or OAM measurement types.
- NWDAF may determine which NF instance(s) of the relevant NF type(s) are serving the UE or group of UEs, optionally taking into account the S-NSSAI(s) and area of interest.
- NWDAF invokes Nnf_EventSubscribe services to collect data from the determined NF instance(s), and/or triggers the procedure to subscribe to OAM services to collect the OAM measurement.

The NWDAF performs data collection from an AF directly or via NEF.

The NWDAF may be able to discover the events supported by a NF.

Data collection procedures enables the NWDAF to efficiently obtain the appropriate data with the appropriate granularity.

When a request or subscription for statistics or predictions is received, the NWDAF may not possess the necessary data to perform the service, including:
- Data on the monitoring period in the past, which is necessary for the provision of statistics and predictions matching the Analytics target period.
- Data on longer monitoring periods in the past, which is necessary for model training.

Therefore, in order to optimize the service quality, the NWDAF may undertake the following actions:
- The NWDAF may return a probability assertion expressing the confidence in the prediction produced. Prediction may be returned with zero confidence as described below. This confidence is likely to grow in the case of subscriptions.
- The value of the confidence depends on the level or urgency expressed by the parameter "preferred level of accuracy of the analytics" as listed, the parameter "time when analytics information is needed", and the availability of data. If no sufficient data is collected to provide an estimation for the requested level of accuracy before the time deadline, the service may return a zero confidence. Otherwise, the NWDAF may wait until enough data is collected before providing a response or a first notification.
- In order to be prepared for future requests on statistics from NFs/OAM, the NWDAF, upon operator configuration, may collect data on its own initiative, e.g. on samples of UEs (e.g. mobility), and retain the data collected in the data storage.

The volume and maximum duration of data storage is also subject of operator configuration.

The NWDAF may decide to reduce the amount of data collected to reduce signaling load, by either prioritizing requests received from analytics consumers, or reducing the extent (e.g. duration, scope) of data collection, or modifying the sampling ratios.

The NWDAF may skip data collection phase when the NWDAF already has enough information to provide requested analytics.

The data which NWDAF may collect is listed for each analytics in input data and is decided by the NWDAF.

NOTE: NWDAF can skip data collection phase for some specific input data per the requested analytics e.g. when some of the data is already available at NWDAF for the requested analytics, or when NWDAF considers that some of the data is not needed at all to provide the requested analytics as per the analytics consumer request (e.g. based on preferred level of accuracy or based on the time when analytics are needed).

<Procedure for Data Collection from NFs>

The procedure in FIG. 4 is used by NWDAF to subscribe/unsubscribe at NFs in order to be notified for data collection on a related event (s), using Event Exposure Services as listed.

1. The NWDAF subscribes to or cancels subscription for a (set of) Event ID(s) by invoking the Nnf_EventExposure_Subscribe/Nnf_EventExposure_Unsubscribe service operation.

2. If NWDAF subscribes to a (set of) Event ID(s), the NFs notify the NWDAF (e.g. with the event report) by invoking Nnf_EventExposure_Notify service operation.

The NWDAF can use the immediate reporting flag to meet the request-response model for data collection from NFs.

<Usage of Exposure Framework by the NWDAF for Data Collection>

The NWDAF may subscribe (and unsubscribe) to the Event exposure service from NF(s) reusing the framework. This framework supports the possibility for the NWDAF to indicate/request:
- Events-ID: one or multiple Event ID(s)
- Target of Event Reporting: the objects targeted by the Events. Within a subscription, all Event ID(s) are associated with the same target of event reporting. In the case of NWDAF, the objects can be UE(s), UE group(s), any UE.
- Event Filter Information. This provides Event Parameter Types and Event Parameter Value(s) to be matched against.
- A Notification Target Address and a Notification Correlation ID, allowing the NWDAF to correlate notifications received from the NF with this subscription.
- Event Reporting Information.
- Expiry time.

The notifications from NFs/AFs contain on top of the Event being reported (and of dedicated information being reported for this event):
- the Notification Correlation Information provided by the NWDAF in its request,
- (when applicable to the event) the Target Id e.g. UE ID (SUPI and if available GPSI), and
- a time stamp.

Figure 5:
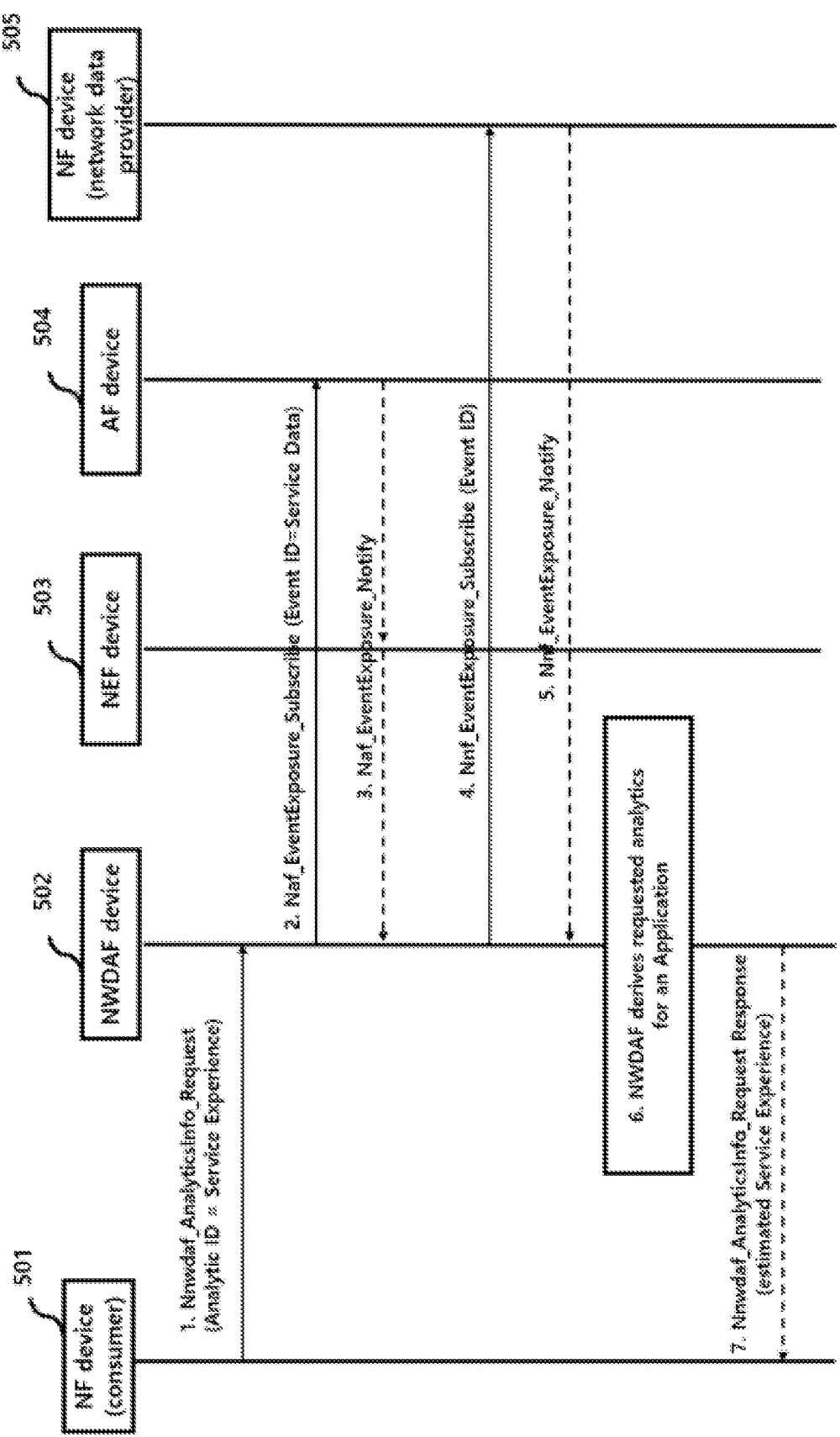
FIG. 5 is a diagram illustrating providing a service experience by the NWDAF device for a application according to an example embodiment.

FIG. 5 is a diagram illustrating providing a service experience by the NWDAF device for a application according to an example embodiment.

<Procedures to Request Service Experience for an Application>

This procedure allows the consumer to request Analytics ID "Service Experience" for a particular Application. The consumer includes both the Application ID for which the Service Experience is requested and indicates that the Target of Analytics Reporting is "any UE". At the same time, for an Application ID, a set of initial QoS parameter combinations per service experience window (e.g. one is for 3<Service MOS<4 and another is for 4<Service MOS<5) is defined in PCF (e.g. by configuration of operator policies) that may be updated based on the Service Experience reported by NWDAF.

1. Consumer NF sends an Analytics request/subscribe (Analytics ID=Service Experience, Target of Analytics Reporting=any UE, Analytics Filter information=(Application ID, Analytics target period S-NSSAI, DNN, Area of Interest)) to NWDAF by invoking a Nnwdaf_AnalyticsInfo_Request or a Nnwdaf_Analytics_Subscription_Subscribe.

2. NWDAF subscribes the service data from AF by invoking Nnef_EventExposure_Subscribe or Naf_EventExposure_Subscribe service (Event ID=Service Experience information, Event Filter information=(Application ID, Area of Interest), Target of Event Reporting=Any UE). In the case of external AF, NEF translates the requested Area of Interest into a list of geographic zone identifier(s).

3. AF device invoke Naf_EventExposure_Notify service operation to the NWDAF

4. NWDAF subscribes the network data from 5GC NF(s) by invoking Nnf_EventExposure_Subscribe service operation.

5. NF device invoke Nnf_EventExposure_Notify to the NWDAF.

6. With these data, the NWDAF estimates the Service experience for the application. With these data, the NWDAF offline trains a Service QoE Model for the given application in the given Area of Interest, which will be used to determine/estimate the Service experience for the application later on.

QoE measurements from the applications are based on outcome of the ongoing "Management of QoE measurement collection" which addresses how to collect the QoE measurements from the applications in the UE.

7. The NWDAF provides the data analytics, i.e. the observed Service Experience (which can be a range of values) to the consumer NF by means of either Nnwdaf_AnalyticsInfo_Request response or Nnwdaf_Analytics_Subscription_Notify, depending on the service used in step 1, indicating how well the used QoS Parameters satisfy the Service MoS agreed between the MNO and the end user or between the MNO and the external ASP.

a) The observed Service Experience e.g. average observed Service MOS.

b) Spatial validity condition, when the estimated Service Experience applies.

If Area of Interest is applied in step 1, spatial validity may apply to the requested Area of Interest.

c) Time validity condition, when the estimated Service Experience applies.

The call flow shows a request-response model for the interaction of NWDAF and consumer NF for implicitly instead of both request-response model and subscription-notification model.

If the consumer NF is a PCF and it determines that the application SLA is not satisfied, it may take into account the Observed Service Experience and the operator policies including SLA and required Service Experience (which can be a range of values) to determine new QoS parameters to be applied for the service.

The non-real time data information from AF includes the service experience data, which indicates the service quality during the service lifetime.

Figure 6:
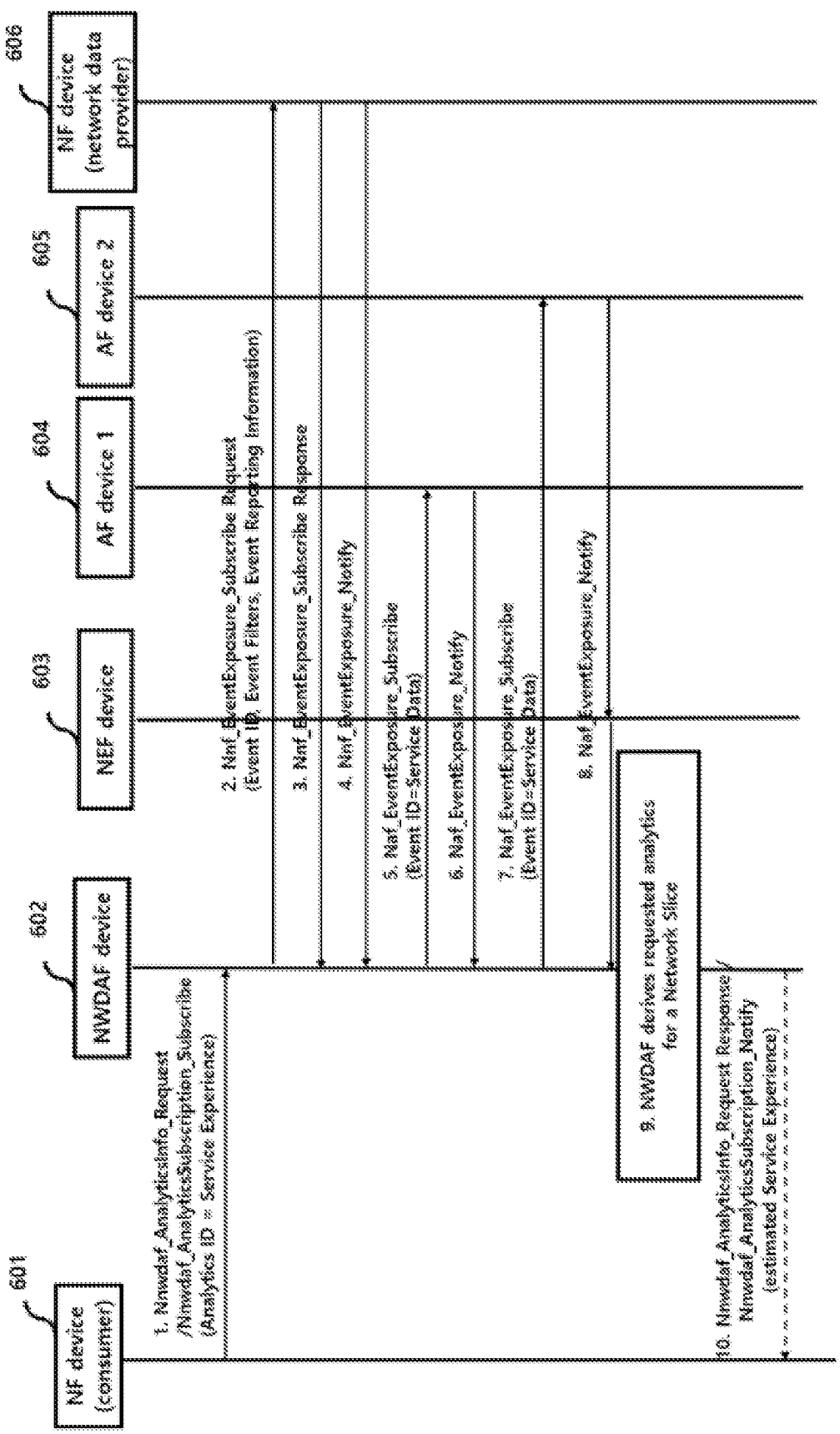
FIG. 6 is a diagram illustrating providing a service experience by the NWDAF device for a network slice according to an example embodiment.

FIG. 6 is a diagram illustrating providing a service experience by the NWDAF device for a network slice according to an example embodiment <Procedures to Request Service Experience for a Network Slice>

This procedure is similar to the procedure, with the following differences. The consumer needs to request the Analytics ID "Service Experience" for all UEs or a group of UEs or a UE on a Network Slice, identified by an S-NSSAI. If multiple Network Slice instances of the same Network Slice are deployed, associated NSI ID(s) may be used in addition to S-NSSAI. If 'any UE' is the target of analytics reporting, NWDAF may subscribe to UE mobility event notifications of AMF using event ID "Area of Interest" and event filters if it is needed to retrieve the list of SUPIs (and GPSIs if available).

The event exposure service request may also include the immediate reporting flag as event reporting information. In addition, service experience data may need to be collected from multiple Applications. If each Application is hosted in a separate AF, NWDAF subscribes the service data from the different AFs by invoking Nnef_EventExposure_Subscribe or Naf_EventExposure_Subscribe services for each Application (Event ID=Service Experience information, Event Filter information=Application ID). FIG. 6 shows an example procedure with two AFs.

If one AF provides the service experience data of multiple Applications, the set of Application IDs is provided by NWDAF to the AF with the Naf_EventExposure_Subscribe service operation. The Observed Service Experience for a Network Slice when consumed by OAM could be used.

1. NF device as consumer invokes Nnwdaf_AnalyticsInfo_Request service operation or Nnwdaf_AnalyticsSubscription_Subscribe service operation to the NWDAF (Analytic ID=Service Experience)

2. NWDAF invokes Nnf_EventExposure_Subscribe Request service operation (Event ID, Event Filter, Event Reporting Information) to the NF device as network data provider.

3. NF as network data provider invokes Nnf_EventExposure_Subscribe Response service operation to the NWDAF.

4. NF as network data provider invokes Nnf_EventExposure_Notify service operation to the NWDAF.

5. NWDAF invokes Naf_EventExposure_Subscribe service operation (Event ID=service data).

6. AF invokes Naf_EventExposure_Notify service operation to the NWDAF.

7. NWDAF invokes Naf_EventExposure_Subscribe (Event ID=service data)

8. AF device 2 invokes Naf_EventExposure_Notify service operation to the NWDAF.

9. NWDAF device derives the request analytics for the network slice.

10. NWDAF device invokes Nnwdaf_AnalyticsInfo_Request Response service operation or Nnwdaf_Analytics_Subscription_Notify service operation including estimated service experience to the NF device as consumer.

FIG. 7 is a diagram illustrating network service functions provided by the NWDAF device according to an example embodiment.

(1) Nnwdaf_AnalyticsSubscription

Nnwdaf_AnalyticsSubscription service operation enables the NF service consumers to subscribe/unsubscribe for different type of analytics from NWDAF (2) Nnwdaf_AnalyticsInfo Nnwdaf_AnalyticsInfo service operation enables the NF service consumers to request and get different type of analytics information from NWDAF.

FIG. 8 is a diagram illustrating network service functions consumed by the NWDAF device for a data collection according to an example embodiment.

<Network Exposure>

The network capability exposure comprises

Exposure of network events externally as well as internally towards core network NFs;

Exposure of provisioning capability towards external functions;

Exposure of policy and charging capabilities towards external functions;

Exposure of core network internal capabilities for analytics.

Exposure of analytics to external party.

Retrieval of data from external party by NWDAF.

When subscribing to event reporting the NF consumer(s) provide:

One or multiple Event ID(s). An Event ID identifies the type of event being subscribed to (e.g. PDU Session Release, UE mobility out of an Area of Interest, etc.).

Event Filter Information: Provides Event Parameter Types and Event Parameter Value(s) to be matched against, in order to meet the condition for notifying the subscribed Event ID e.g. the Event Parameter Type could be "Area of interest" and Event Parameter Value list could be list of TAs; The Event Filter depends on the Event ID. The Event Filter Information is provided per Event ID(s) being subscribed to: within a subscription different Event ID(s) may be associated with different Event Filter Information.

Event Reporting Information. Within a subscription all Event ID(s) are associated with a unique Event Reporting Information.

Target of Event Reporting: this may indicate a specific UE or PDU Session, a group of UE(s) or any UE (i.e. all UEs), Within a subscription all Event ID (s) are associated with the same Target of Event Reporting (possibly corresponding to multiple UE or multiple PDU Sessions).

A Notification Target Address (+Notification Correlation ID) allowing the Event Receiving NF to correlate notifications received from the Event provider with this subscription. A subscription is associated with an unique Notification Target Address (+Notification Correlation ID). In the case that the NF consumer subscribes to the NF producer on behalf of other NF, the NF consumer includes the Notification Target Address (+Notification Correlation ID) of other NF for the Event ID which is to be notified to other NF directly, and the Notification Target Address(+Notification Correlation ID) of itself for the Subscription change related event notification.

Each Notification Target Address(+Notification Correlation ID) is associated with related (set of) Event ID(s).

An Expiry time represents the time up to which the subscription is desired to be kept as active. The NF service consumer may suggest an Expiry time and provide to the NF service producer. Based on the operator's policy, the NF service producer decides whether the subscription can be expired. If the subscription can be expired, the NF service producer determines the Expiry time and provide it in the response to the NF service consumer. If the event subscription is about to expire based on the received Expiry time and the NF service consumer wants to keep receiving notifications, the NF service consumer update the subscription with the NF service producer in order to extend the Expiry time. Once the Expiry time associated with the subscription is reached, the subscription becomes invalid at the NF service producer. If the NF service consumer wants to keep receiving notifications, it may create a new subscription with the NF service producer.

When the subscription is accepted by the Event provider NF, the consumer NF receives from the event provider NF an identifier (Subscription Correlation ID) allowing to further manage (modify, delete) this subscription.

The Notification Correlation ID is allocated by the consumer NF that subscribes to event reporting and the Subscription Correlation ID is allocated by the NF that notifies when the event is met. Both correlation identifiers can be assigned the same value, although in principle they are supposed to be different, as they are optimized for finding the subscription related context within each NE The consumer NF may use an operation dedicated to subscription modification to add or remove Event ID(s) to this subscription or to modify Event Filter Information.

Events are subscribed by the consumer NF(s) by providing Event Filters. The contents of the Event Reporting Information along with the presence requirement of each information element is described.

TABLE 1

| Event Reporting Information Parameter | Description |
|---|---|
| Event reporting mode | Mode of reporting-e.g., reporting up to a maximum number of reports, periodic reporting along with periodicity, reporting up to a maximum duration |
| Maximum number of reports | Maximum number of reports after which the event subscription ceases to exist |
| Maximum duration of reporting | Maximum duration after which the event subscription ceases to exist |
| Immediate reporting flag | The Event provider NF notifies the current status of the subscribed event, if available, immediately to the service consumer NF. |
| Sampling ratio | Percentage of sampling (1% . . . 100%) among impacted UEs. |
| Group Reporting Guard Time | Parameter for group-based monitoring configuration to indicate the time for which the Monitoring Event Reporting(s) detected by the UEs in a group can be aggregated before sending them to the service consumer NF. |

<Data Collection from NFs>

The Data Collection from NFs is used by NWDAF to subscribe/unsubscribe at any 5GC NF to be notified for data on a set of events.

The Data Collection from NFs is based on the services of AMF, SMF, UDM, PCF, NRF and AF (possibly via NEF):

Event Exposure Service offered by each NE other NF services (e.g. Nnrf_NFDiscovery and Nnrf_NF-Management in NRF)

This data collection service is used directly in order to retrieve behaviour data for individual UEs or groups of UEs (e.g. UE reachability), and also to retrieve global UE information (e.g. Number of UEs present in a geographical area).

The present document specifies that NWDAF can collect some UPF input data for deriving analytics, but how NWDAF collects these UPF input data is not defined.

When NWDAF receives a request addressed to an Internal Group ID from a consumer, NWDAF may need to initiate data collection from several 5GC NFs, such as AMF, SMF, UDM, PCF, NEF/AF, etc. NWDAF may first discover the instances of the required 5GC NFs deployed in the network, e.g. by querying NRF.

For discovering the UDM, NWDAF can query the NRF with the Internal Group ID as the target of the query. For discovering AMF, SMF, PCF, NEF, and AF, NWDAF may need to discover all the instances in the network by using the Nnrf_NFDiscovery service.

It is assumed that all members of an Internal Group ID belong to the same UDM Group ID. NWDAF can select a UDM instance supporting the UDM Group ID of the Internal Group ID.

Then, if data needs to be collected from AMF, SMF, UDM, and PCF, NWDAF may initiate the data collection with the Internal Group ID as the target, e.g. subscribing to the event exposure in all the instances of a given type of network function. This subscription to all the instances of required source of event exposure handles, e.g. mobility of UEs across AMFs, or initiation of new PDU sessions with different allocated SMFs.

For collecting data from AMF and SMF, NWDAF may collect the data directly from AMF and/or SMF, or indirectly via UDM.

The NEF instance that is serving a specific network slices and/or applications of a UE should be determined using NRF using optional request parameters.

If NWDAF needs to collect data from an AF deployed outside the operator's domain, the NWDAF may contact NEF with a SUPI or Internal Group ID as the target of the data collection. NEF is responsible for translation of SUPI to GPSI, or internal to external group identifiers, by querying UDM, prior to contacting the AF.

<NEF>

Exposure of analytics:
NWDAF analytics may be securely exposed by NEF for external party.

Retrieval of data from external party by NWDAF:
Data provided by the external party may be collected by NWDAF via NEF for analytics generation purpose.

NEF handles and forwards requests and notifications between NWDAF and AF.

<NRF>

The Network Repository Function (NRF) supports the following functionality:
Supported Analytics ID(s), NWDAF Serving Area information (i.e. list of TAIs for which the NWDAF can provide analytics) if available in the case of NWDAF.
NOTE 4: The NWDAF's Serving Area information is common to all its supported Analytics IDs.
Event ID(s) supported by AFs, in the case of NEF.
Application ID(s) supported by AFs, in the case of NEF.
This is applicable when NEF exposes AF information for analytics purpose.

<Data Collection from an AF>

An NF that needs to collect data from an AF may subscribe/unsubscribe to notifications regarding data collected from an AF, either directly from the AF or via NEF.

The data collected from an AF is used as input for analytics by the NWDAF.

The details for the data collected from an AF as well as interactions between NEF, AF and NWDAF are described.

<Observed Service Experience Related Network Data Analytics>

NWDAF subscribes the network data from 5GC NF(s) and the service data from AF, or via NEF to train a Service MOS Model for the given application in the given Area of Interest and then provides the observed service experience for the application in the given Area of Interest.

This description specifies how NWDAF can provide Observed Service Experience (i.e. average observed Service MoS) analytics, in the form of statistics or predictions, to a service consumer.

The Observed Service Experience analytics may provide one or both of the following:
Service Experience for a Network Slice: Service Experience for UEs (for a UE or a group of or any UE) for a given Application or a set of Applications or any Application (i.e. all Applications) in a Network Slice;
Service Experience for an Application: Service Experience (i.e. for a UE or a group of UEs or any UE) in an Application.

Therefore, Observed Service experience may be provided individually per UE or group of UEs, or globally, averaged per Application or averaged across a set of Applications on a Network Slice.

The service consumer may be an NF (e.g. PCF), or the OAM.

The consumer of these analytics may indicate in the request or subscription:
Analytics Id set to "Service Experience";
The Target of Analytics Reporting: one or more SUPI(s) or Internal Group Identifier(s), or "any UE";
Analytics Filter Information and maximum number of objects and maximum number of SUPIs;
An Analytics target period that indicates the time window for which the statistics or predictions are requested;
In a subscription, the Notification Correlation Id and the Notification Target Address.

If Area of Interest is applied in Analytics Filter Information by the service consumer, the Area of Interest may be a subset of the NWDAF Serving Area information.

The NWDAF may notify the result of the analytics to the consumer.

NWDAF collects the network data from AF (directly or via NEF) and from other 5GC NF(s) in order to calculate and provides statistics and predictions on the observed service experience to a consumer NF or to OAM.

FIG. 9 is a diagram illustrating analytic filter information related to observed service experience according to an example embodiment.

<Analytics Filter Information Related to the Observed Service Experience>

Application ID (1 . . . n): The identification of the application(s) for which the analytics information is subscribed or requested.

If no Application ID is provided, the Analytics Filter information applies to any application (i.e. all applications) in the Network Slice.

S-NSSAI: Identifies the Network Slice for which analytics information is subscribed or requested.

The S-NSSAI is mandatory if the NWDAF Service Consumer subscribes or requests the Service Experience in a Network Slice. Optionally, when multiple Network Slice instances of the same Network Slice (i.e. S-NSSAI) are deployed, associated NSI ID is used in addition to S-NSSAI.

Area of Interest: Identifies the Area (i.e. set of TAIs) where the analytics information is subscribed or requested.

Media/application bandwidth: Identifies the Media/application bandwidth requirement of the application.

DNN: DNN to access the application.

DNAI: Identifier of a user plane access to one or more DN(s) where applications are deployed <Input Data>

The service data collected from the AF, the network data from other 5GC NFs and the network data from OAM for observed service experience are defined.

NWDAF subscribes to the service data from AF either directly by invoking Naf_EventExposure_Subscribe service (Event ID=Service Data, Event Filter information=Application ID, Area of Interest), or via NEF by invoking Nnef_EventExposure_Subscribe service.

<Service Data from AF Related to the Observed Service Experience>

Application ID: To identify the service and support analytics per type of service (the desired level of service)

IP filter information: Identify a service flow of the UE for the application

Locations of Application: Locations of application represented by a list of DNAI(s). The NEF may map the AF-Service-Identifier information to a list of DNAI(s) when the DNAI(s) being used by the application are statically defined.

Service Experience: Refers to the QoE per service flow as established in the SLA and during on boarding. It can be either e.g. MOS or video MOS or a customized MOS Timestamp: A time stamp associated to the Service Experience provided by the AF, mandatory if the Service Experience is provided by the ASP.

FIG. 11 is a diagram illustrating QoS flow level of network data collected from NF device in 5G core network related to QoS profile according to an example embodiment.

<Input Data>

NWDAF subscribes to the network data from 5GC NF(s) by invoking Nnf_EventExposure_Subscribe service operation with the following Event IDs as input parameters:

AMF Source: Namf_EventExposure_Subscribe (Event IDs=Location Changes, Area of Interest).

SMF Source: Nsmf_EventExposure_Subscribe (Event ID=QFI allocation).

QoS flow level Network Data from 5GC NF related to the QoS profile assigned for a particular service (identified by an Application Id or IP filter information)

Timestamp: A time stamp associated with the collected information Location: The UE location information.

SUPI(s): If UE IDs are not provided as target of analytics reporting for slice service experience, AMF returns the UE IDs matching the AMF event filters.

DNN: DNN for the PDU Session which contains the QoS flow

S-NSSAI: S-NSSAI for the PDU Session which contains the QoS flow

Application ID: Used by NWDAF to identify the application service provider and application for the QoS flow IP filter information: Provided by the SMF, which is used by NWDAF to identify the service data flow for policy control and/or differentiated charging for the QoS flow QFI: QoS Flow Identifier QoS flow Bit Rate: The observed bit rate for UL direction; and the observed bit rate for DL direction QoS flow Packet Delay: The observed Packet delay for UL direction; and the observed Packet delay for the DL direction Packet transmission: The observed number of packet transmission Packet retransmission: The observed number of packet retransmission FIG. 12 is a diagram illustrating UE level of network data collected from the OAM device related to QoS profile according to an example embodiment.

<Input Data>

NWDAF subscribes the network data from OAM by using the services provided by OAM.

<UE Level Network Data from OAM Related to the QoS Profile>

Timestamp: A time stamp associated with the collected information

Reference Signal Received Power: The per UE measurement of the received power level in a network cell, including SS-RSRP, CSI-RSRP and E-UTRA RSRP.

Reference Signal Received Quality: The per UE measurement of the received quality in a network cell, including SS-RSRQ, CSI-RSRQ and E-UTRA RSRQ.

Signal-to-noise and interference ratio: The per UE measurement of the received signal to noise and interference ratio in a network cell, including SS-SINR, CSI-SINR, E-UTRA RS-SINR.

FIG. 13 is a diagram illustrating event filter information related to service data collected from the AF device according to an example embodiment <Input Data>

The Event Filter for the service data collection from AF is defined.

The Event Filter for the service data collection from SMF and AMF are defined.

The timestamps are provided by each NF to allow correlation of QoS and traffic KPIs. The clock reference is able to know the accuracy of the time and correlate the time series of the data retrieved from each NF.

<Event Filter Information Related to the Service Data from AF>

Application ID (1..n): An identification of the application or a set of identifications of the applications.

Area of Interest: Area of Interest which restricts the area in focus

<Output Analytics>

The NWDAF services are used to expose the analytics.

Service Experience statistics information is defined.

Service Experience predictions information is defined.

The number of Service Experiences and SUPIs are limited respectively by the maximum number of objects and the Maximum number of SUPIs provided as input parameter.

FIG. 14 is a diagram illustrating Service Experience statistics according to an example embodiment <Service Experience Statistics>

S-NSSAI: Identifies the Network Slice for which analytics information is provided.

Service experiences (1 . . . n): List of observed service experience information for each Network Slice instance.
- NSI ID: Identifies the Network Slice instance within the Network Slice.
- Slice instance service experience: Service experience across Applications on a Network Slice instance instance over the Analytics target period (average, variance).
- Application ServiceExperiences (1..max): List of observed service experience information for each Application.
- Application ID: Identification of the application.
- Service Experience Type: Type of Service Experience analytics, e.g. on voice, video, other.

Service Experience: Service Experience over the Analytics target period (average, variance).

SUPI list (0.. SUPImax): List of SUPI(s) for each application service experience.

Ratio: Estimated percentage of UEs with similar service experience (in the group, or among all UEs).

Spatial validity: Area where the estimated Service Experience applies.

If Area of Interest information was provided in the request or subscription, spatial validity should be the requested Area of Interest.

Validity period: Validity period

Slice service experience: Service experience across applications on a Network

Slice over the Analytics target period (average, variance).

FIG. 15 is a diagram illustrating Service Experience predictions according to an example embodiment.

<Service Experience Predictions>

S-NSSAI: Identifies the Network Slice for which analytics information is provided.

Service experiences (1 . . . n): List of observed service experience information for each Network Slice instance NSI ID: Identifies the Network Slice instance within the Network Slice.

Slice instance service experience: Service experience across Applications on a Network Slice instance instance over the Analytics target period (average, variance).

Application ServiceExperiences (1..max): List of observed service experience information for each Application.

Application ID: Identification of the application.

Service Experience Type: Type of Service Experience analytics, e.g. on voice, video, other.

Service Experience: Service Experience over the Analytics target period (average, variance).

SUPI list (0..SUPImax): List of SUPI(s) for each application service experience.

Ratio: Estimated percentage of UEs with similar service experience (in the group, or among all UEs).

Spatial validity: Area where the estimated Service Experience applies.

If Area of Interest information was provided in the request or subscription, spatial validity should be the requested Area of Interest.

Validity period: Validity period

Probability assertion: Confidence of this prediction.

Slice service experience: Service experience across applications on a Network Slice over the Analytics target period (average, variance).

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The apparatus described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for providing service experience analysis comprising:
    receiving, by a NWDAF (network data analytics function) device, a Nnwdaf_AnalyticsInfo_Request service operation or a Nnwdaf_AnalyticsSubscription_Subscribe service operation from a first NF (network function) device, wherein the Nnwdaf_AnalyticsInfo_Request service operation or the Nnwdaf_AnalyticsSubscription_Subscribe service operation includes analytics ID corresponding to service experience;
    invoking, by the NWDAF device, a Naf_EventExposure_Subscribe service operation to an AF (application function) device, wherein the Naf_EventExposure_Subscribe service operation includes event ID and the event ID corresponds to service data;
    invoking, by the NWDAF device, a Nnf_EventExposure_Subscribe service operation to a second NF device as a network data provider, wherein the Nnf_EventExposure_Subscribe service operation includes the event ID;
    deriving, by the NWDAF device, a request analytics for an application;
    invoking a Nnwdaf_AnalyticsInfo_Request Response service operation or a Nnwdaf_AnalyticsSubscription_Notify service operation to the first NF device, wherein the Nnwdaf_AnalyticsInfo_Request Response service operation and the Nnwdaf_AnalyticsSubscription_Notify service operation includes an estimated service experience.

2. The method of claim 1, wherein the NWDAF device provides the estimated service experience including a service experience statistics information or a service experience prediction information to the first NF device.

3. The method of claim 2, wherein the service experience statistics information includes at least one of S-NSSAI, Service experiences, NSI (network slice instance) ID, Slice instance service experience, Application ServiceExperiences, Application ID, Service Experience Type, Service Experience, SUPI (subscription permanent identifier) list, Ratio and Spatial validity.

4. The method of claim 2, wherein the service experience prediction information includes at least one of S-NSSAI, Service experiences, NSI ID, Slice instance service experience, Application ServiceExperiences, Application ID, Service Experience Type, Service Experience, SUPI list, Ratio, Probability assertion and Spatial validity.

5. The method of claim 1, wherein the NWDAF device subscribes to a service data from the AF device by invoking the Nnef_EventExposure_Subscribe service operation or the Naf_EventExposure_Subscribe service operation.

6. The method of claim 5, wherein the Nnef_EventExposure_Subscribe service operation or the Naf_EventExposure_Subscribe service operation includes (i) Event ID corresponding to service experience information, (ii) Event filter information corresponding to application ID and area of interest, and (iii) target of event reporting corresponding to any UE.

7. The method of claim 1, when the AF device is an external AF, wherein a NEF (network exposure function) device translates a requested Area of Interest into list of geographic zone identifier.

8. The method of claim 7, wherein the data analytics indicate how well QoS (quality of service) parameters satisfy a Service MoS (mean opinion score) agreed between a MNO (Mobile Network Operator) and the end user or between the MNO and an external ASP (Application Service Provider).

9. The method of claim 1, wherein the NWDAF device receives an analytic request or an analytic subscription by invoking a Nnwdaf_AnalyticsInfo_Request service operation or a Nnwdaf_AnalyticsSubscription_Subscribe service operation by the first NF device.

10. The method of claim 1, wherein the Nnwdaf_AnalyticsInfo_Request service operation or Nnwdaf_AnalyticsSubscription_Subscribe service operation includes (i) Analytic ID corresponding to service experience, (ii) Target of Analytics Reporting corresponding to any UE (user equipment) and (iii) Analytic filter information corresponding to Application ID, Analytics target period, S-NSSAI (single network slice selection assistance information), DNN (data network name) and area of interest.

11. A method for providing service experience analysis comprising:
    receiving, by a NWDAF device, a Nnwdaf_AnalyticsInfo_Request service operation or Nnwdaf_AnalyticsSubscription_Subscribe service operation from a first NF device, wherein the Nnwdaf_AnalyticsInfo_Request service operation or the Nnwdaf_AnalyticsSubscription_Subscribe service operation includes analytics ID corresponding to service experience;
    invoking, by the NWDAF device, Nnf_EventExposure_Subscribe Request service operation to a second NF device as network data provider, wherein the Nnf_EventExposure_Subscribe Request service operation includes Event ID, Event filter and Event Reporting information;
    invoking, by the NWDAF device, a Naf_EventExposure_Subscribe service operation to an AF device, wherein the Naf_EventExposure_Subscribe service operation includes event ID corresponding to service data;
    deriving, by the NWDAF device, a requested analytics for a network slice;
    invoking a Nnwdaf_AnalyticsInfo_Request Response service operation or a Nnwdaf_AnalyticsSubscription_Notify service operation to the first NF device, wherein the Nnwdaf_AnalyticsInfo_Request Response service operation or the Nnwdaf_AnalyticsSubscription_Notify service operation includes an estimated service experience.

12. An apparatus for providing service experience analysis comprising:
    one or more processor of a NWDAF (network data analytics function) device configured to:
    receive a Nnwdaf_AnalyticsInfo_Request service operation or a Nnwdaf_AnalyticsSubscription_Subscribe service operation from a first NF (network function) device, wherein the Nnwdaf_AnalyticsInfo_Request service operation or the Nnwdaf_AnalyticsSubscription_Subscribe service operation includes analytics ID corresponding to service experience;
    invoke a Naf_EventExposure_Subscribe service operation to an AF (application function) device, wherein the Naf_EventExposure_Subscribe service operation includes event ID and the event ID corresponds to service data;
    invoke a Nnf_EventExposure_Subscribe service operation to a second NF device as a network data provider, wherein the Nnf_EventExposure_Subscribe service operation includes event ID;
    derive a request analytics for an application;
    invoke a Nnwdaf_AnalyticsInfo_Request Response service operation or a Nnwdaf_AnalyticsSubscription_Notify service operation to the first NF device, wherein the Nnwdaf_AnalyticsInfo_Request Response service operation or the Nnwdaf_AnalyticsSubscription_Notify service operation includes an estimated service experience, wherein the processor is a hardware processor.

13. The apparatus of claim 12, wherein the NWDAF device provides the estimated service experience including a service experience statistics information or a service experience prediction information to the first NF device.

14. The apparatus of claim 13, wherein the service experience statistics information includes at least one of S-NS-SAI, Service experiences, NSI ID, Slice instance service experience, Application ServiceExperiences, Application ID, Service Experience Type, Service Experience, SUPI (subscription permanent identifier) list, Ratio and Spatial validity.

15. The apparatus of claim 13, wherein the service experience prediction information includes at least one of S-NS-SAI, Service experiences, NSI ID, Slice instance service experience, Application ServiceExperiences, Application ID, Service Experience Type, Service Experience, SUPI list, Ratio, Probability assertion and Spatial validity.

16. The apparatus of claim 12, wherein the NWDAF device subscribes to a service data from the AF device by invoking the Nnef_EventExposure_Subscribe service operation or the Naf_EventExposure_Subscribe service operation.

17. The apparatus of claim 16, wherein the Nnef_EventExposure_Subscribe service operation or the Naf_EventExposure_Subscribe service operation includes (i) Event ID corresponding to service experience information, (ii) Event filter information corresponding to application ID and area of interest, and (iii) target of event reporting corresponding to any UE.

18. The apparatus of claim 12, when the AF device is an external AF, wherein a NEF (network exposure function) device translates a requested Area of Interest into list of geographic zone identifier.

19. The apparatus of claim 12, wherein the data analytics indicate how well QoS (quality of service) parameters satisfy a Service MoS (mean opinion score) agreed between a MNO (Mobile Network Operator) and the end user or between the MNO and an external ASP (Application Service Provider).

20. The apparatus of claim 12, wherein the NWDAF device receives an analytic request or an analytic subscription by invoking a Nnwdaf_AnalyticsInfo_Request service operation or a Nnwdaf_AnalyticsSubscription_Subscribe service operation by the first NF device.

* * * * *